Figure 1:
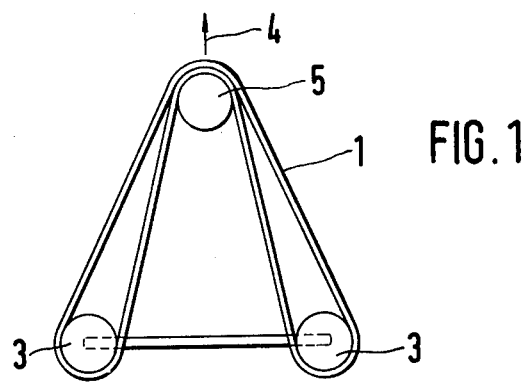

United States Patent [19]

Schelkmann

[11] 4,147,642
[45] Apr. 3, 1979

[54] METHOD AND APPARATUS FOR THE RENEWAL OF THE TREAD OF A WORN PNEUMATIC OR SOLID RUBBER TIRE

[75] Inventor: Wilhelm Schelkmann, Witten, Fed. Rep. of Germany

[73] Assignee: Vakuum Vulk Holding Limited, Nassau, The Bahamas

[21] Appl. No.: 801,411

[22] Filed: May 27, 1977

[51] Int. Cl.² ............... B29H 17/37; B29H 17/38
[52] U.S. Cl. ............................... 156/96; 29/235; 156/129; 156/289; 156/537
[58] Field of Search ............ 156/85, 86, 87, 95, 156/96, 110 R, 123 R, 125, 126, 127, 128, 129, 285, 286, 289, 394, 537; 29/235; 264/36, 327, 101, 102, 259, 255, 264, 266, 90

[56] References Cited

U.S. PATENT DOCUMENTS

| | | | |
|---|---|---|---|
| 2,474,013 | 6/1949 | Rawls | 156/289 |
| 2,623,571 | 12/1952 | Webber | 156/122 |
| 3,121,649 | 2/1964 | Oliver | 156/289 |
| 3,689,337 | 9/1972 | Schelkmann | 156/95 |
| 3,945,871 | 3/1976 | Schelkman | 156/212 |
| 3,976,532 | 8/1976 | Barefoot | 156/96 |
| 3,983,193 | 9/1976 | Wulker et al. | 156/394 |

FOREIGN PATENT DOCUMENTS 746375 3/1956 United Kingdom ............... 156/96

Primary Examiner—John E. Kittle
Attorney, Agent, or Firm—Shuyler, Birch, Swindler, McKie & Beckett

[57] ABSTRACT

Renewal of the running surface of a worn Pneumatic or solid rubber tire, in which a layer of bonding rubber is applied to the prepared body of the tire and to the interior of a prefabricated precured rubber tread ring has gaseous inclusions between the applied layers led away and the assembly prepared in this way is heated in an autoclave for vulcanizing the layer of bonding rubber. The tread ring directly before applying it to the body is stretched very hard in a simple stretching mechanism so that when the tread ring is removed from the stretching mechanism a free stretch of about three to four percent remains temporarily. This allows the freed but stretched tread ring to be slipped over the body without further auxiliary means retaining the ring stretched and the ring to be arranged in exact correlation with the circumference of the body. The free stretch rapidly and continuously reduces to about one percent permanent stretch. In any case the duration of the temporary free stretch, which is available after the stretching process is completed and freed, is adequate for applying the tread ring to the body of a prepared tire in a simple manner.

8 Claims, 4 Drawing Figures

U.S. Patent  Apr. 3, 1979  4,147,642

METHOD AND APPARATUS FOR THE RENEWAL OF THE TREAD OF A WORN PNEUMATIC OR SOLID RUBBER TIRE

The invention refers to a method of and a apparatus for the renewal of the running surface of a worn pneumatic or solid rubber tire, in which a layer of bonding rubber is applied to the prepared body of the tire and to the former a prefabricated rubber tread, gaseous inclusions between the applied layers are avoided or led away and the blank prepared in this way is heated in an autoclave for vulcanizing the layer of bonding rubber.

In known methods the blank is enclosed in a rubber jacket onto which internal and/or external pressure is then brought into action so that the gas inclusions present in the layered structure of the blank escape. Furthermore the layered structure of the blank is fixed by the jacket, especially for the critical state which appears when under the influence of the heat of vulcanization the bonding rubber becomes plastic and finally shortly before vulcanization even liquid. Jackets are costly to produce, they are easily damaged and are then leaky. Their life is limited depending upon the material, vulcanization temperature and kind of treatment.

If the tread is applied to the prepared body already in the form of a closed ring the danger exists of the plastic layer of bonding rubber becoming non-uniform or of the tread sticking firmly to the layer of bonding rubber before it has been brought into the required position.

Other known methods assume a relatively great mechanical effort, or frequently undesirable imbalances occur through non-uniform distribution of the tread material along the circumference of the body.

The object of the invention consists in improving the above-mentioned method in such a way that the blank in a simple manner without the jacket usual hitherto may be prepared ready for the treatment in autoclaves and heated without any jacket in the autoclave for vulcanizing of the layer of bonding rubber.

It is therefore proposed that in a stretching process there is imparted to the tread ring directly before application to the body a stretch running in the circumferential direction, which the tread ring maintains temporarily without stretching means, such that the diameter of the stretched tread ring is greater than the diameter of the body.

According to this method in accordance with the invention the tread ring directly before applying it to the body is stretched very hard in a simple stretching mechanism so that when the tread ring is removed from the stretching mechanism a free stretch of about 3-4% results temporarily, which allows the tread ring to be slipped over the body without further auxiliary means and the ring, preferably in the horizontal position of the body, to be arranged in exact correlation with the circumference of the body. The free stretch of, for example, 4% rapidly and continuously reduces to about 1% permanent stretch. In any case the duration of the temporary free stretch which is available after the stretching process is adequate for applying the tread ring to the body in a simple manner.

The extent of the necessary temporary stretching of the tread ring depends upon various factors, in particular upon the degree of free stretch desired and upon the composition of the tread rubber. In practical tests with commercial tread material, stretching of, for example, about 100% with subsequent temporary free stretch of about 4% has been applied, but also smaller degrees of stretching have proved adequate.

Since the stretching process and likewise the state of temporary free stretch has included every part of the tread ring, there follows also the gradual reduction of the stretch to a permanent value everywhere uniformly along the circumference of the ring, so that no imbalances can occur.

It is advantageous that the tread ring on its underside exhibits a rough face of projections and recesses forming a network of passages, produced in the press mould and kept fit for bonding.

Roughening of the tread by means of a roughening machines directly before the tread ring is applied is dispensed with as well as the thereby ensuing loss of rubber material as well as the considerable consumption of time for the work itself of roughening.

The diameter of the unstretched tread ring may be given just the same dimension as the diameter of the body. In this case the permanent remainder of the free stretch, which amounts to only a very small percentage, could be easily equalized by rolling on the applied tread ring.

But preferably the diameter of the tread ring before the stretching process is smaller than the diameter of the body, that is, by at least one percent. The consequences of this is that after the reduction of the free stretch no oversize results and the diameter of the tread ring and the body are in the end equal. The selection of a diameter of the tread ring before the stretching process, which is smaller by more than 1% leads in the end to the tread ring seating on the body under tension, since the diameter of the tread ring after the reduction of the free stretch is smaller than the outer diameter of the body. In this case the advantage of easy application of the tread ring to which a free stretch has temporarily been imparted, is combined with the further improvement that the tread ring is seated tightly onto the body. Furthermore in this way automatic escape of gaseous components from the gaps is achieved. For contact of the tread against the domed body starts, seen in cross-section, at their center and increases progressively to the sides, so that the gaseous components can be forced out to the sides and not included. If still further pressure is needed for this, where necessary a pressure-band or net as mentioned above may be employed in addition.

If in applying the tread ring only a small difference in diameter between the tread ring and the body is preferred it is advantageous if the layer of bonding rubber before application of the tread ring is covered with a slide-foil of plastics which after pulling on of the tread ring is pulled out again from the applied layers. Pulling out again is advantageously carried out immediately after the application of the tread ring, before its free stretch further diminishes. The slide-foil is preferably hung like a tablecloth loosely over the tire arranged horizontally, so that the edge regions of the slide-foil cover the periphery of the body at least to its center all round. A central cut-out from the slide-foil may be used for easy centering of the slide-foil with respect to the tire. Also for the case where the tread ring is coated with the layer of bonding rubber the slide-foil is spread over the body.

Figure 2:
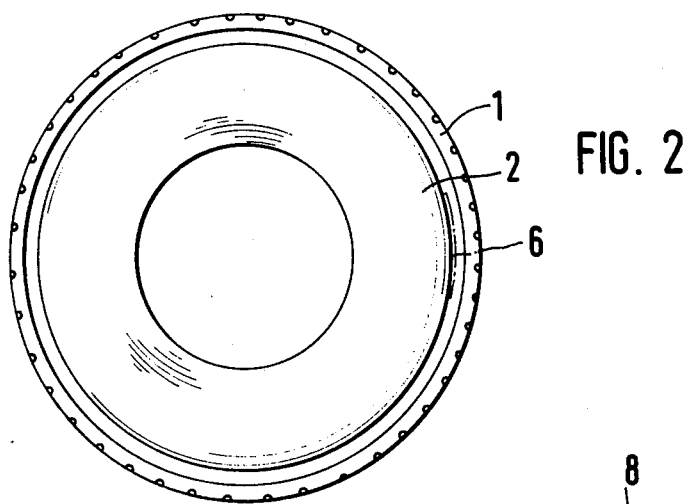
Figure 3:
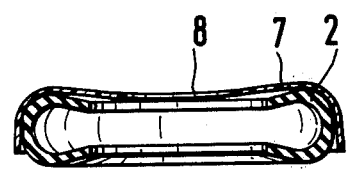
Figure 4:
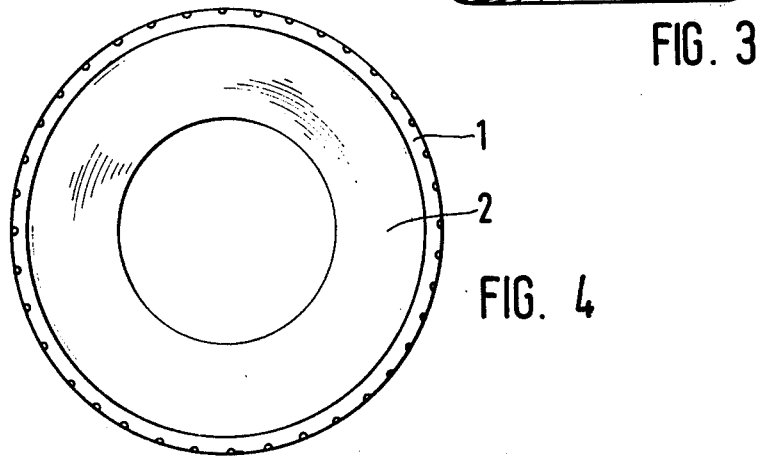

The method and apparatus for it in accordance with the invention is explained in greater detail below with the aid of the drawings. In the drawings there is shown in:

FIG. 1 a diagrammatic illustration of the stretching mechanism which may be used in the first phase of the application of a tread ring to a body;

FIG. 2 a diagrammatic side elevation of the second phase in which a stretched tread ring is being applied to a body;

FIG. 3 a sectional elevation of the body in the second phase where a slide-foil is being employed;

FIG. 4 a diagrammatic side elevation of a body in the third phase in which the tread ring is resting firmly against the body.

According to a special method of applying a tread in the form of a ring to a body 2 the tread ring 1 with a preferably preformed rough face is subjected to stretching of the order of magnitude of about 100% (depending upon the rubber mixture, form of profile, thickness of tread rubber, desired free stretch), in which the tread ring 1 is laid over two rollers 3 as well as a roller 5 which can be displaced mechanically, electrically, or hydraulically in the direction of the arrow 4, and is stretched by appropriate displacement of the roller 5. In the case of this stretching of only brief duration the tread ring 1 directly after its unloading exhibits a free stretch in the circumferential direction of, for example about 4%, which after the unloading of the tread ring 1 gradually reduces again down to a residual value of about 1%, which is reached in a short while.

If the inside diameter of the tread ring 1 is just as large as the diameter of the periphery of the body 2 when coated with a layer 6 of bonding rubber, or is smaller, that is, for example, by 1–2% than this body diameter, the tread ring 1 (comp. FIG. 2) can easily and without effort be slipped over the body coated with bonding rubber 6, in which case because of the temporary stretch there is a very small clearance between the body 2 and the tread ring 1. For this reason it is essential that the tread ring 1 be applied to the body 2 directly after the stretching process. With originally equal diameters and a temporary free stretch of 12 cm the clearance amounts to about 2 cm all round, so that unimpeded slipping of the tread ring 1 over the body 2 is possible.

Because of the decrease in the stretch, in a short while, depending upon the choice of diameters before the stretching process, the phase illustrated in FIG. 4 is reached, in which the tread ring 1 is resting firmly against the body coated with bonding rubber 6.

The application of the tread ring 1 can be performed without special auxiliary means and the ratio between the diameters existing directly after the stretching process affords the possibility of bringing the tread ring 1 by appropriate shifting with respect to the body 2, into an exactly centered position on the body 2. But advantageously, in order to be able to slip the tread ring 1 without any special precautions over the body 2, a slide-foil 7, preferably of superfine clinging plastics fabric having a central cut-out 8 for centering (comp. FIG. 3), is hung over the body 2 arranged horizontally. After the application of the tread ring 1 the slide-foil 7 is pulled effortlessly out of the blank.

A further considerable advantage of the invention consists in the fact that the same size of tread ring may be applied for the whole field of tolerance of the bodies of one tire size, that is, by appropriate stretching the necessary equalization may be carried out.

After the third phase in accordance with FIG. 4 is reached, the blank thus processed may for vulcanizing the layer 6 of bonding rubber be inserted in a pressure chamber and heated. In case of necessity another reduced pressure treatment of any kind may also be applied beforehand in order to lead away possible gaseous inclusions between the applied layers. It is also possible before the heating in the pressure chamber to connect the tread ring 1 in the region of the lateral points of outlet form the layer 6 of bonding rubber by mechanical or chemical action firmly and tightly to the body 2 in order to prevent possible slipping of the tread ring 1 when the layer 6 of bonding rubber becomes liquid directly before vulcanizing.

If the inside diameter of the tread ring 1 is chosen smaller than the greatest outside diameter of the domed body 2, as already stated above there follows automatic escape of gaseous media from the gaps because the tread ring 1 makes contact with the body 2 from the centre progressively to the sides. The escape is promoted by the network of passages present in the preformed rough face.

For slipping the tread ring 1 over, the body 2 is advantageously laid on a centering table having a funnel-shaped receiving or table face, so that bodies of different sizes may be covered on the same table. The tread ring 1 may slide down to the oblique receiving-face and then always adopts a centered position on the body 2.

What we claim is:

1. A method of renewal of the tread of a worn pneumatic or solid rubber tire comprising the steps of:
   applying a layer of bonding rubber to the exterior of a prepared tire body,
   imparting a very hard stretch to a prefabricated pre-cured rubber tread ring to such an amount that its inner diameter will be much greater than the diameter of the tire body to which it is to be applied and the tread rubber plastically deforms longitudinally to an extent that upon being freed from the stretching forces the tread rubber will gradually reduce longitudinally down to a point of retaining a residual permanent stretch,
   freeing said tread ring from the forces employed in imparting said stretch,
   placing the freed previously stretched tread ring over the tire body while the tread ring that was very hard stretched to a large diameter retains temporarily an inner diameter greater than and in the range of the diameter of the tire body,
   leading away gaseous inclusions between said tire body and said tread ring, and
   heating the assembly of said tire body and said tread ring to vulcanize said layer of bonding rubber between said tire body and said tread ring.

2. A method according to claim 1 characterized in that the tread ring, in the form of an endless loop, is placed around two or more rollers, and said tread ring is stretched to a greater circumference by moving at least one of said rollers with respect to the others.

3. A method according to claim 1, in which the temporary free stretch resulting from the stretching of the tread ring amounts directly after the stretching 3–4%.

4. A method according to claim 1 in which the diameter of the tread ring before the stretching process is smaller than the diameter of the body.

5. A method according to claim 4, in which diameter of the tread ring is smaller than the diameter of the body by at least 1%.

6. A method according to claim 1 in which the body coated with the layer of bonding rubber is provided before application of the tread ring with a slip-foil of plastics material which after placing of the tread ring is pulled out again from the applied layers.

7. A method according to claim 6, in which the slip-foil is spread over the body, which is horizontally arranged, so that the edge regions of the slip-foil cover the periphery of the body at least to its center, and has a central cut-out for centering 8. A method according to claim 1 in which the tread ring is slipped over the body lying on a centering table and guided down until the bottom edge of the tread ring rests all round on an oblique receiving and centering surface.

* * * * *